No. 810,372. PATENTED JAN. 16, 1906.
J. O. HAAS.
STEERING KNUCKLE FOR VEHICLES.
APPLICATION FILED FEB. 16, 1905.

2 SHEETS—SHEET 1.

Witnesses
E. F. Stewart
Wm. Bagger

Jackson O. Haas, Inventor
by C. A. Snow & Co.
Attorneys

No. 810,372. PATENTED JAN. 16, 1906.
J. O. HAAS.
STEERING KNUCKLE FOR VEHICLES.
APPLICATION FILED FEB. 16, 1905.

2 SHEETS—SHEET 2.

Witnesses
E. H. Stewart
Wm. Bagger

Jackson O. Haas, Inventor.
by C. A. Snow & Co.
Attorneys

UNITED STATES PATENT OFFICE.

JACKSON O. HAAS, OF POTTSVILLE, PENNSYLVANIA.

STEERING-KNUCKLE FOR VEHICLES.

No. 810,372.            Specification of Letters Patent.            Patented Jan. 16, 1906.

Original application filed October 21, 1904, Serial No. 229,481. Divided and this application filed February 16, 1905. Serial No. 245,936.

*To all whom it may concern:*

Be it known that I, JACKSON O. HAAS, a citizen of the United States, residing at Pottsville, in the county of Schuylkill and State of Pennsylvania, have invented a new and useful Steering-Knuckle for Motor-Vehicles, of which the following is a specification.

This invention relates to steering-knuckles for motor-vehicles, and is a division of the application for Letters Patent for improvements in a running-gear for motor-vehicles filed by myself on the 21st day of October, 1904, Serial No. 229,481.

This invention has particular reference to the steering-knuckles whereby the wheels are connected with the front axle, the object being to improve and to simplify the construction and operation of said parts, to provide a strong and durable construction, to relieve strain upon the hinge connection between the steering-knuckle and the axle, this being of especial importance when the vehicle equipped with the invention is turning around curves at great speed, and to enable the wheels to be readily adjusted as upon vertical or approximately vertical pivots in the act of steering the vehicle.

With these and other ends in view, which will readily appear as the nature of the invention is better understood, the said invention, which is applicable to all kinds and classes of motor-vehicles, light and heavy, even including the heaviest traction-engines, and which may be used in connection with all kinds of wheels—such as artillery-wheels, dished wheels, tilted wheels, wire wheels, or even the heavy steering-wheels of traction-engines and motor-trucks—consists in the improved construction and novel arrangement and combination of parts, which will be hereinafter fully described, and particularly pointed out in the claims.

Figure 1:
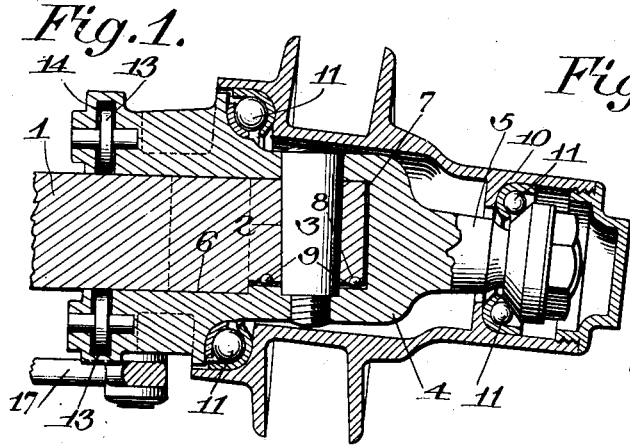
Figure 3:
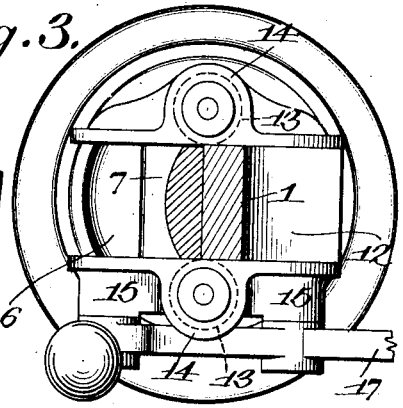
Figure 2:
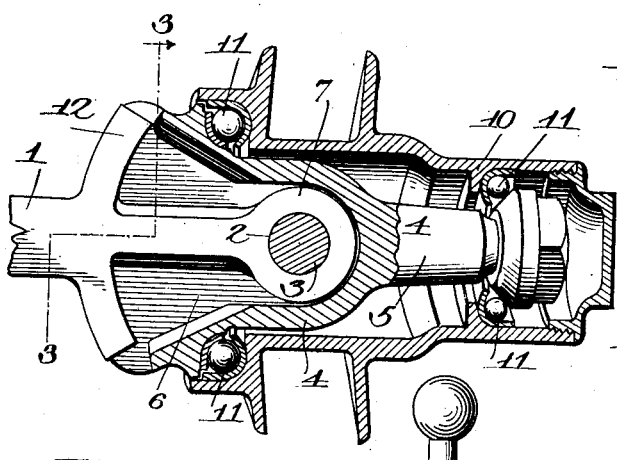
Figure 4:
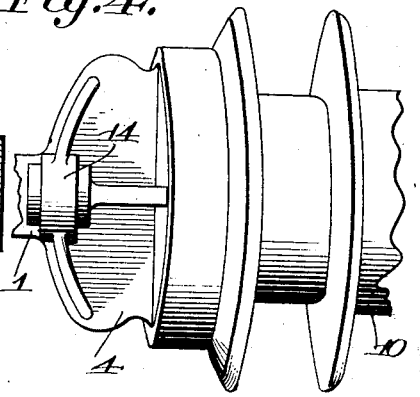
Figure 5:
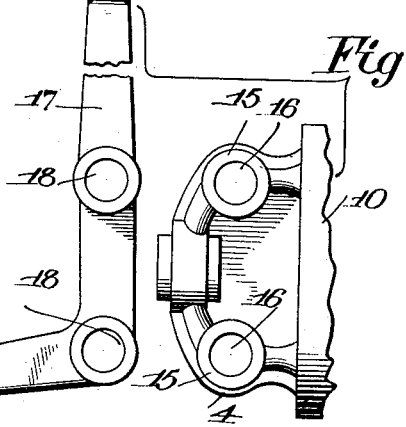
Figure 8:
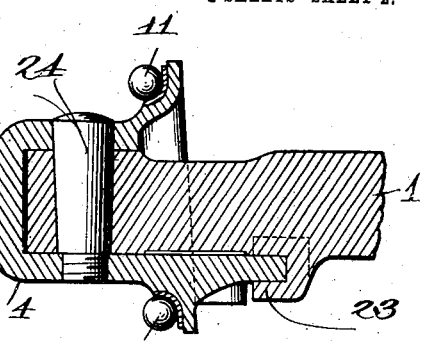
Figure 6:
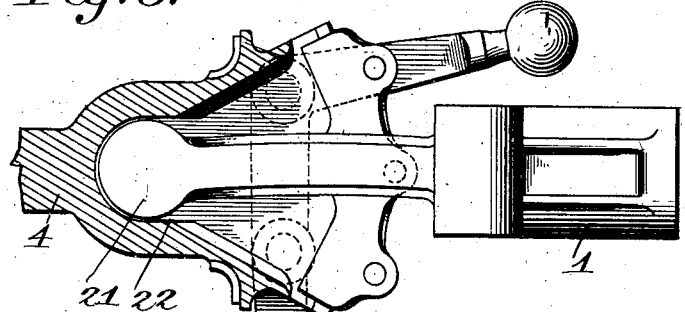
Figure 9:
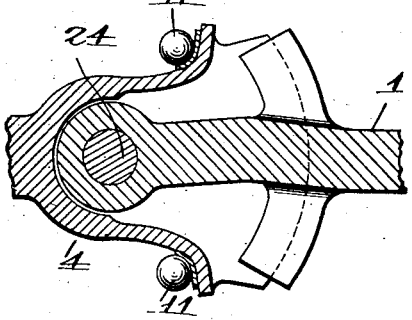
Figure 7:
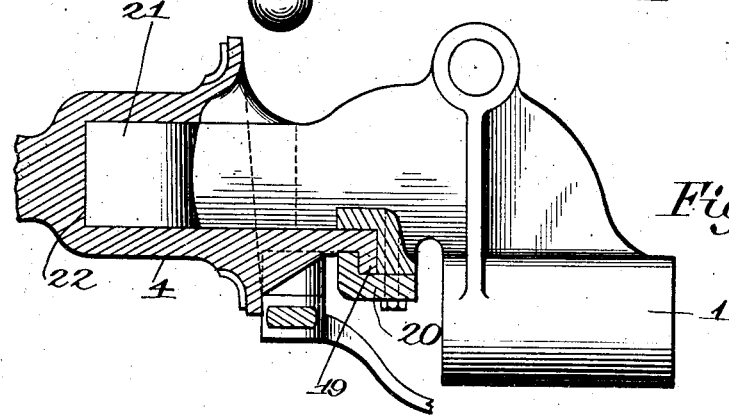

In the accompanying drawings, Figure 1 is a vertical sectional view taken through one end of an axle and through the hub and steering-knuckle of one of the front wheels. Fig. 2 is a horizontal sectional view of the same. Fig. 3 is a transverse sectional view taken on the line 3 3 in Fig. 2. Fig. 4 is a top plan view of the steering-knuckle and the inner end of the hub. Fig. 5 is a bottom plan view showing the inner portion of the steering-knuckle and one of the steering-arms, the latter being detached from the knuckle. Figs. 6 and 7 are detail views illustrating certain modifications in the construction of the steering-knuckle. Figs. 8 and 9 are detail views showing a further modification of the knuckle.

Corresponding parts in the several figures are indicated throughout by similar characters of reference.

Under the preferred construction, which has been illustrated in Figs. 1 to 5, inclusive, the axle 1 is provided at the end thereof with an eye or aperture 2 for the reception of a pivotal pin 3, upon which the steering-knuckle 4 is pivotally mounted. In practice it is intended that the axis of the pivot shall be tilted or inclined in a forward direction at its lower end, and this may be accomplished by tilting the axle or supporting the latter in a tilted position; but this feature has not been illustrated in the accompanying drawings, and the same will not be claimed in the present application, which is limited more particularly to the construction of the steering-knuckle and its related parts.

The steering-knuckle 4 includes a spindle or stub-axle 5, and it is provided at its inner end with a recess 6, the inner end of which is suitably shaped for the reception of the approximately cylindrical outer extremity 7 of the axle, which is apertured for the reception of the pin 3. The recess 6 is made outwardly-tapering, as clearly shown in Figs. 2, 6, and 9 of the drawings, so as to permit the knuckle to swing freely upon the pivot whereby it is connected with the axle to the requisite extent.

A ball-race 8 is preferably formed in the under side of the axle concentric with the axis of the pivot 3 for the accomodation of balls 9 to reduce the friction between the axle and the steering-knuckle. The latter, as previously described, is formed with a spindle 5, upon which the hub 10 is mounted for rotation, antifriction-balls 11 being interposed in the usual manner.

The axle is provided with curved lateral extensions 12, which are formed concentric with the axis of the pin or pivot 3 and which serve as tracks for antifriction-rollers 13, journaled in suitable recesses or housings 14, formed in the adjacent sides of the steering-knuckle, which latter is thereby enabled to turn freely, the vertical strain being taken up by the said antifriction-rollers. It is obvious, of course, that the antifriction means may be dispensed with within the scope of the invention.

The inner end of the steering-knuckle, which constitutes the casing contained in the recess 6, is provided on the under side thereof with bosses 15, which are recessed, as at 16, for the reception of bolts or connecting members, whereby it is connected with the steering-arm 17, which is provided with corresponding apertures 18. Said steering-arm has been shown in the form of a bell-crank lever, one arm of which is to be suitably connected with a corresponding arm connected with the steering-knuckle at the opposite end of the axle and the other arm of which is to be suitably connected with the steering mechanism of the vehicle.

In Figs. 6 and 7 has been shown a modified construction of the steering-knuckle, whereby the upper portion of the casing, or the portion overhanging the axle, and the pivotal pin 3 are dispensed with. Under this modification the inner end of the knuckle is provided with a depending flange 19, which is engaged by a hook-shaped clip 20, connected with the axle, upon which the steering-knuckle is thus retained in position in such a manner as to be capable of turning freely upon the head 21 of the axle, which is of approximately cylindrical shape and which is fitted in the inner end of the recess, (here designated 22.) It will be seen that under this construction the pivotal pin is dispensed with, the axis upon which the knuckle turns being the central line of the head 21.

Under the modification illustrated in Figs. 8 and 9 the axle has been shown as provided with a hook-shaped flange 23 upon the under side thereof, said flange engaging the inner edge of the lower part of the steering-knuckle, which in this instance is connected detachably with the axle by means of a pivotal pin, (here designated 24.) In Fig. 9 the end of the axle has been shown as curved forward for the following reason: When the direction of the travel of the vehicle is changed from a straight-ahead direction to a curve, the steering-wheel, moving on the inner track or smaller arc, must assume a greater angle to the axis than the outer wheel, which moves on the larger of the two concentric arcs. The axle being pivoted in the center of the hub is therefore bent forward to allow the wheel moving on the smaller arc to assume a greater angle.

From the foregoing description, taken in connection with the drawings hereto annexed, the operation and advantages of this invention will be readily understood by those skilled in the art to which it appertains. The construction is simple and inexpensive and of such a nature as to permit the free adjustment of the knuckles in the act of steering the vehicle. The parts may be easily assembled or taken apart, as may be required, and the parts being few and simple there is little liability of breakage or of the parts getting out of order.

While I have in the foregoing described simple and preferred forms of the invention, it does not follow that I limit myself to the precise structural details herein set forth, inasmuch as changes, especially with regard to size, shape, and exact manner of assemblage, may be made within the scope of the invention and without departing from the spirit or sacrificing the efficiency of the same.

Having thus described the invention, what is claimed is—

1. An axle having an approximately cylindrical head, a steering-knuckle having a recess pivotally engaging said head, the lower wall of said recess constituting a flange concentric with the pivot, and a hook-shaped member upon the axle engaging said flange.

2. An axle having a forwardly-curved terminal end and provided with an approximately cylindrical head, in combination with a steering-knuckle having a recess receiving and pivotally engaging said head.

3. The combination with an axle terminating in an approximately cylindrical head, of a steering-knuckle pivotally engaging said head and provided with bosses upon its under side, and a bell-crank lever constituting a steering-arm and having apertures registering with said bosses and suitably connected therewith.

4. The combination with an axle having lateral extensions constituting a curved track and provided with an approximately cylindrical head, and a steering-knuckle having a flaring recess engaging said head pivotally and concentric with the curved track; the upper and lower walls of said recess constituting housings; and members mounted for rotation in said housings and engaging the curved track.

In testimony that I claim the foregoing as my own I have hereto affixed my signature in the presence of two witnesses.

JACKSON O. HAAS.

Witnesses:
E. P. LEUSCHNER,
JOHN C. RIEGEL.